United States Patent
Brown, IV et al.

(10) Patent No.: US 12,172,729 B2
(45) Date of Patent: Dec. 24, 2024

(54) AIR SPRING ASSEMBLY

(71) Applicant: Fox Factory, Inc., Duluth, GA (US)

(72) Inventors: William O. Brown, IV, Aptos, CA (US); Daniel McCormick, Santa Cruz, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 17/984,853

(22) Filed: Nov. 10, 2022

(65) Prior Publication Data

US 2024/0116596 A1 Apr. 11, 2024

Related U.S. Application Data

(63) Continuation of application No. 16/790,231, filed on Feb. 13, 2020, now Pat. No. 11,498,639.

(60) Provisional application No. 62/805,859, filed on Feb. 14, 2019.

(51) Int. Cl.
  *B62K 25/10* (2006.01)
  *B60G 15/14* (2006.01)
  *B62K 25/08* (2006.01)
  *F16F 9/02* (2006.01)

(52) U.S. Cl.
  CPC ............. *B62K 25/10* (2013.01); *B60G 15/14* (2013.01); *B62K 25/08* (2013.01); *F16F 9/0209* (2013.01); *B60G 2202/152* (2013.01); *B60G 2202/30* (2013.01)

(58) Field of Classification Search
  CPC ........ B62K 25/10; B62K 25/08; F16F 9/0209
  See application file for complete search history.

(56) References Cited

U.S. PATENT DOCUMENTS

| | | |
|---|---|---|
| 8,123,006 B1 | 2/2012 | Schroeder et al. |
| 2007/0090624 A1 | 4/2007 | Chen |
| 2009/0065316 A1 | 3/2009 | Chen |
| 2011/0221108 A1 | 9/2011 | Uchiyama |
| 2012/0285778 A1 | 11/2012 | Becker et al. |
| 2013/0249181 A1 | 9/2013 | Becker et al. |
| 2021/0394860 A1 | 12/2021 | Lynch et al. |

*Primary Examiner* — Tony H Winner

(57) ABSTRACT

An air spring assembly is disclosed. The air spring assembly includes an upper fork tube having a base lug on one end, a lower fork tube having an opening to receive the upper fork tube in a first axial end, and a fork tube gas seal to form a gas seal between the upper fork tube and the lower fork tube. A partial cartridge tube within a portion of the upper fork tube, the partial cartridge tube including a partial cartridge tube gas seal between an outer diameter (OD) of the partial cartridge tube and an inner diameter (ID) of the upper fork tube. An annular volume formed between the ID of the upper fork tube, the OD of the partial cartridge tube, the partial cartridge tube gas seal, and the base lug of the upper fork tube.

20 Claims, 10 Drawing Sheets

AIR SPRING ASSEMBLY

CROSS-REFERENCE TO RELATED APPLICATION

This application is a Continuation and claims priority to and benefit of co-pending U.S. patent application Ser. No. 16/790,231 filed on Feb. 13, 2020, entitled "AIR SPRING ASSEMBLY" by William O. Brown IV et al., and assigned to the assignee of the present application, the disclosure of which is hereby incorporated by reference in its entirety.

The application Ser. No. 16/790,231 claims priority to and benefit of U.S. Provisional Patent Application No. 62/805,859 filed on Feb. 14, 2019, entitled "AIR SPRING ASSEMBLY" by William O. Brown IV et al., and assigned to the assignee of the present application, the disclosure of which is hereby incorporated by reference in its entirety.

FIELD OF THE INVENTION

Embodiments of the invention generally relate to an air spring assembly.

BACKGROUND

Presently, the ability to adjust the total effective air spring characteristics in an air spring portion of a suspension are an ongoing challenge. These challenges include the effect of different environments, vehicles, performance requirements, rider skill level, rider comfort requirements, and the like. Moreover, the transition between different vehicle uses, e.g., downhill versus uphill, road versus off-road, etc. can cause different air spring suspension characteristics to be of differing values.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

Figure 1:
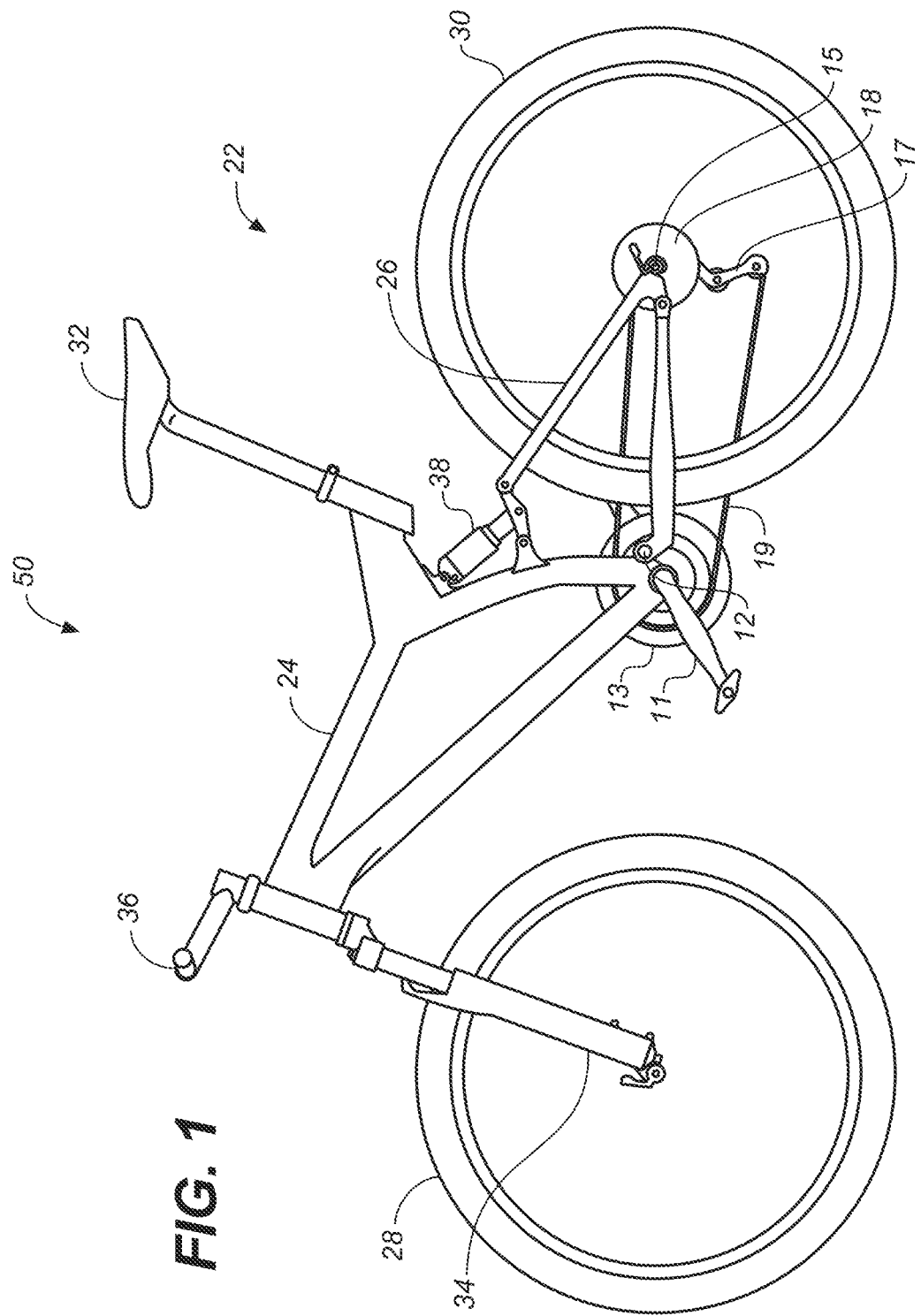
FIG. 1 is a perspective view of a bicycle having an air spring, in accordance with an embodiment.

FIG. 1 is a perspective view of a bicycle 50 having an air spring, shown in accordance with an embodiment. Bicycle 50 includes a main frame 24 with a suspension system comprising a swing arm portion 26 that, in use, is able to move relative to the rest of main frame 24; this movement is permitted by, inter alia, a rear shock 38. The front fork 34 also provides a suspension function via a damping assembly in at least one fork leg; as such the bicycle 50 is a full suspension bicycle (such as an MTB or mountain bike), although the embodiments described herein are not limited to use on full suspension bicycles.

In general, the term "suspension system" is intended to include vehicles having front suspension, rear suspension, or both front and rear suspension. In one embodiment, swing arm portion 26 is pivotally attached to the main frame 24 at pivot point 12 which is located above the bottom bracket axis 11. Although pivot point 12 is shown in a specific location, it should be appreciated that pivot point 12 can be found at different distances from bottom bracket axis 11 depending upon the rear suspension configuration. The use of the specific pivot point 12 herein is provided merely for purposes of clarity. Bottom bracket axis 11 is the center of the pedal and front sprocket assembly 13. Bicycle 50 includes a front wheel 28 which is coupled to the main frame 24 via front fork 34 and a rear wheel 30 which is coupled to the main frame 24 via swing arm portion 26. A seat 32 is connected to the main frame 24 in order to support a rider of the bicycle 50.

The front wheel 28 is supported by front fork 34 which, in turn, is secured to the main frame 24 by a handlebar assembly 36. The rear wheel 30 is connected to the swing arm portion 26 of the frame 22 at rear wheel axis 15. A rear shock 38 is positioned between the swing arm portion 26 and the frame 22 to provide resistance to the pivoting motion of the swing arm portion 26 about pivot point 12. Thus, the illustrated bicycle 50 includes a suspension member between swing arm portion 26 and the main frame 24 which operate to substantially reduce rear wheel 30 impact forces from being transmitted to the rider of the bicycle 50.

Bicycle 50 is driven by a chain 19 that is coupled with both front sprocket assembly 13 and rear sprocket 18. As the rider pedals the front sprocket assembly 13 is rotated about bottom bracket axis 11 a force is applied to chain 19 which transfers the energy to rear sprocket 18. Chain tension device 17 provides a variable amount of tension on chain 19.

In one embodiment, the air spring assembly is located within the front fork 34. Although the following discussion refers to the air spring assembly in context of a bicycle, and specifically in the front fork 34 of the bicycle, it should be appreciated that the air spring assembly could be used in different suspensions and in different vehicles such as, but not limited to a bicycle, motorcycle, ATV, jet ski, car, etc. Moreover, although a number of components are shown in the disclosed figures, it should be appreciated that one or more of the components of the air spring assembly could be fixed or could be interchangeable. Further, one or more of the components could be adjusted, modified, removed, added, or exchanged for personal reasons, for performance reasons, for different applications (e.g., road, downhill, offroad, uphill, etc.), for different vehicles, and the like.

Figure 2:
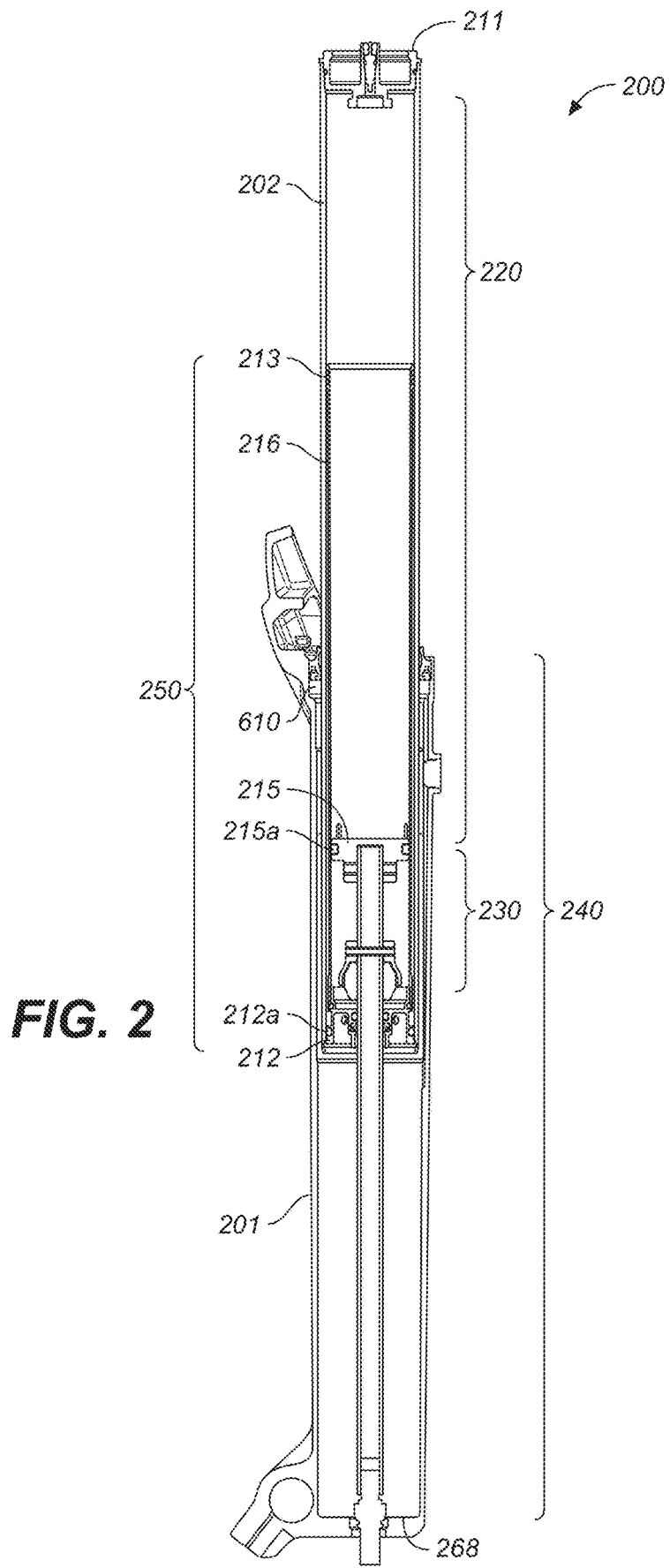
FIG. 2 is a cross-sectional view of an air spring assembly in accordance with an embodiment.

With reference now to FIG. 2 a cross-sectional view of an air spring assembly 200 is shown in accordance with an embodiment. Air spring assembly 200 includes a top cap 211, a lower fork tube 201, an upper fork tube 202, a partial cartridge tube 216, a partial cartridge tube gas seal 213, a moveable piston 215 with a piston gas seal 215*a*, a base 212 with a base gas seal 212*a*, a positive air spring volume 220, a negative air spring volume 230, a lower leg gas volume 240, and an annular gas volume 250.

The positive air spring volume 220 is at the top of the air spring and includes the area from the top cap 211 (or to the top of partial cartridge tube 216) and within partial cartridge tube 216 to gas seal 215*a* on movable piston 215. The negative air spring volume 230 includes the space below gas seal 215*a* on movable piston 215 down toward gas seal 212*a* on the base 212 within partial cartridge tube 216. The lower leg gas volume 240 is defined as the space from the gas seal 610 to atmosphere at the top of lower fork tube 201, about the exterior of upper fork tube 202, to the bottom 268 of the air spring assembly 200 as shown in FIG. 2.

In one embodiment, the positive air spring is the volume that is compressed as the moveable piston 215 is driven upward during a compression of the fork. Thus, as the fork compresses-the positive air spring volume 220 compresses. The negative air spring volume 230 is the volume that is expanded as the moveable piston 215 is driven upward during a compression of the fork. Thus, as the fork compresses-the negative air spring volume 230 expands. In one embodiment, the positive air spring volume 220 and the negative air spring volume 230 communicate at one or more position(s)/stroke(s) through an internal bypass channel.

In one embodiment, partial cartridge tube 216 can be an integral part of the fork or it can be a removably coupleable part that is axially added to the internals of the upper fork tube. For example, the air spring could have a main piston seal on the inner diameter of the upper fork tube 202. In another embodiment, a cartridge air spring is used. In general, a cartridge air spring is completely separable from the upper fork tube 202. In other words, it can be removed from the upper fork tube 202 and it would still be an air spring. In general, the cartridge air spring is coaxial and is a cartridge that threads into the upper fork tube 202 of the suspension fork. Thus, the cartridge air spring would have an outer diameter that is smaller than the inner diameter of the upper fork tube 202.

Figure 3:
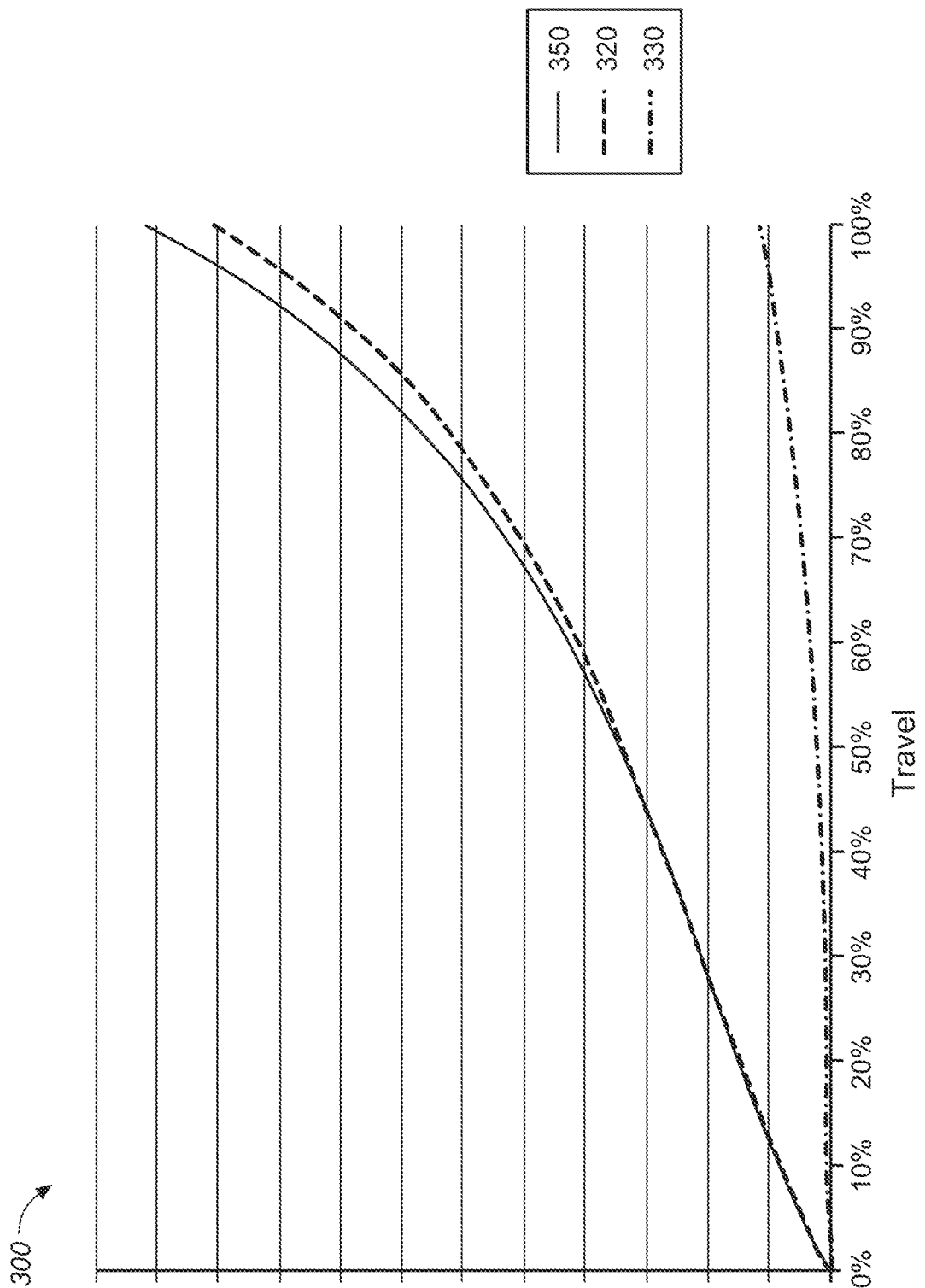
FIG. 3 is a graphical representation of the air spring contributions in accordance with an embodiment.

FIG. 3 is a graphical representation 300 of the air spring contributions 320 (e.g., the combination of the positive air spring and the negative air spring), the lower leg contribution 330 (e.g., the lower gas volume), and the superposition of the two provides the total effective air spring 350 which is what the rider feels. In traditional air springs, there were only three gas volumes, e.g., a positive air spring volume, a negative air spring volume, and a lower leg gas volume.

However, as shown in FIG. 2 (and in further detail in FIG. 5), air spring assembly 200 has four gas volumes. By adding partial cartridge tube 216 and its associated partial cartridge tube gas seal 213, the fourth gas volume, e.g., the annular gas volume 250, is created and can be used for tuning the total effective air spring 350 curve.

As described herein, annular gas volume 250 can be fluidly coupled to one (or more) of the other air volumes, e.g., positive air spring volume 220, negative air spring volume 230, and/or lower leg gas volume 240. In traditional air springs, it was hard to balance positive versus negative gas volumes as there was always a compromise on ramp up in one or both directions. Similarly, with a cartridge air spring (seal on inner diameter of the full cartridge tube) it is also hard to balance positive versus negative gas volumes and there was always a compromise on ramp up in one or both directions. Further, with cartridge-style air springs there is an undesirable coupling of the full cartridge tube to the top cap.

Figure 4:
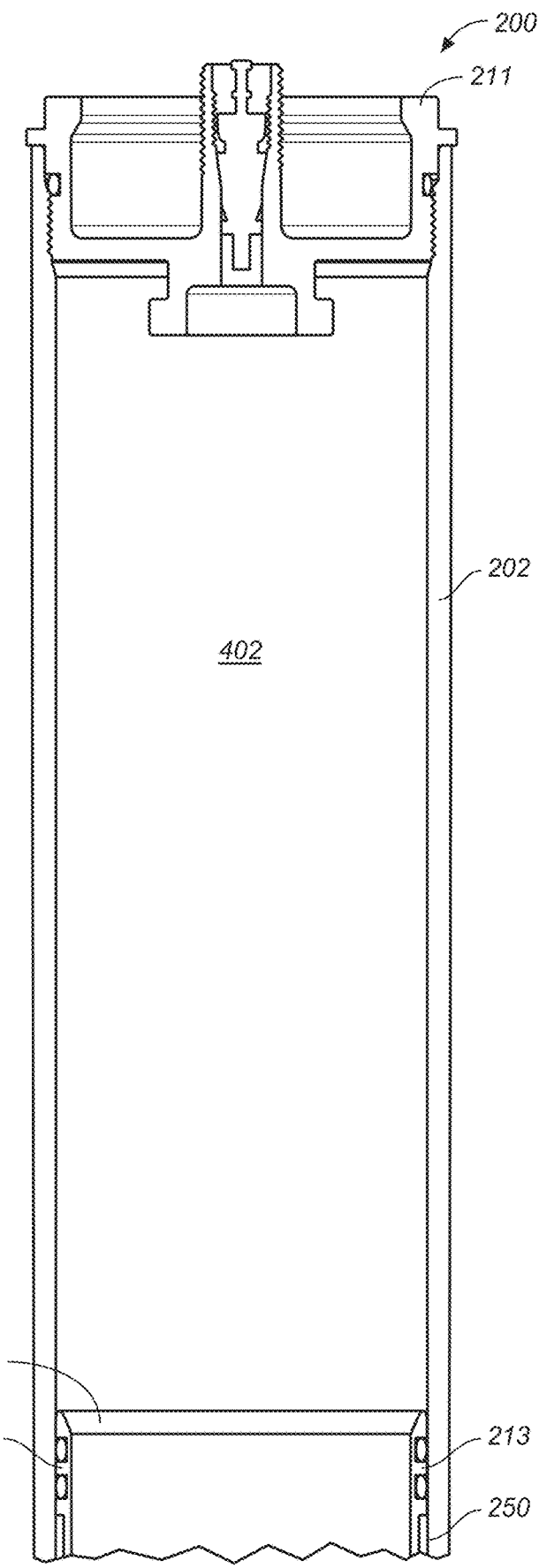
FIG. 4 is a cross-sectional view of a top-portion of the air spring assembly in accordance with an embodiment.

With reference now to FIG. 4, a cross-sectional view of a top portion of the air spring assembly 200 is shown in accordance with an embodiment. FIG. 4 includes the top cap 211, upper fork tube 202, partial cartridge tube 216, and partial cartridge tube gas seal 213 between the inner diameter of upper fork tube 202 and the outer diameter of partial cartridge tube 216 to create annular gas volume 250. The top cap 211 seals the positive air spring volume 220 to atmosphere. In one embodiment, the partial cartridge tube seal 213 may be located further from the top cap 211 that the end of the partial cartridge tube 216 such that positive air spring volume 220 is fluidly connected to at least a portion of annular gas volume 250.

Partial cartridge tube 216 has a smaller outer diameter than the inner diameter of upper fork tube 202. In addition, partial cartridge tube 216 is shorter in length than the length of upper fork tube 202 (e.g., partial cartridge tube 216 partially fills upper fork tube 202). In one embodiment, there is partial cartridge tube gas seal 213 between partial cartridge tube 216 and upper fork tube 202. In one embodiment, partial cartridge tube gas seal 213 is formed with O-rings. Although O-rings are discussed, it should be appreciated that partial cartridge tube gas seal 213 could be formed via other sealing methods, the use of O-rings is merely one of a number of sealing methods and is disclosed in an embodiment herein for purposes of clarity.

Figure 5:
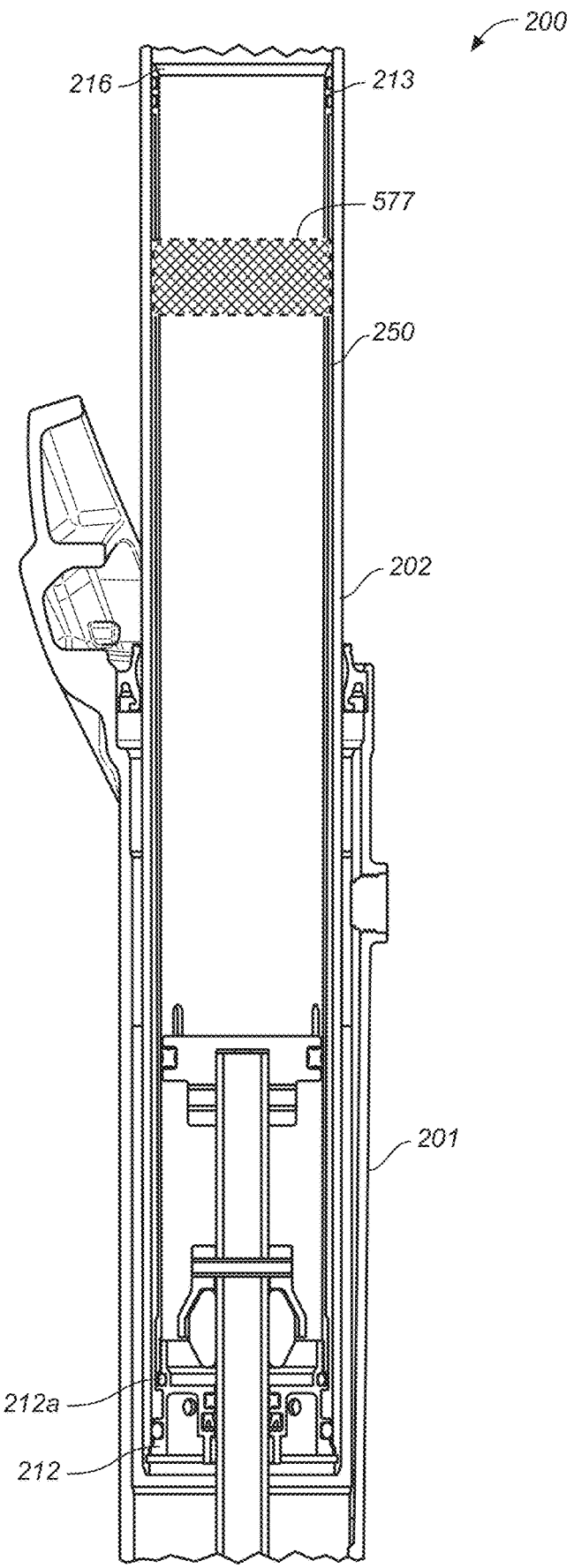
FIG. 5 is a cross-sectional view of a mid-portion of the air spring assembly in accordance with an embodiment.
Figure 10:
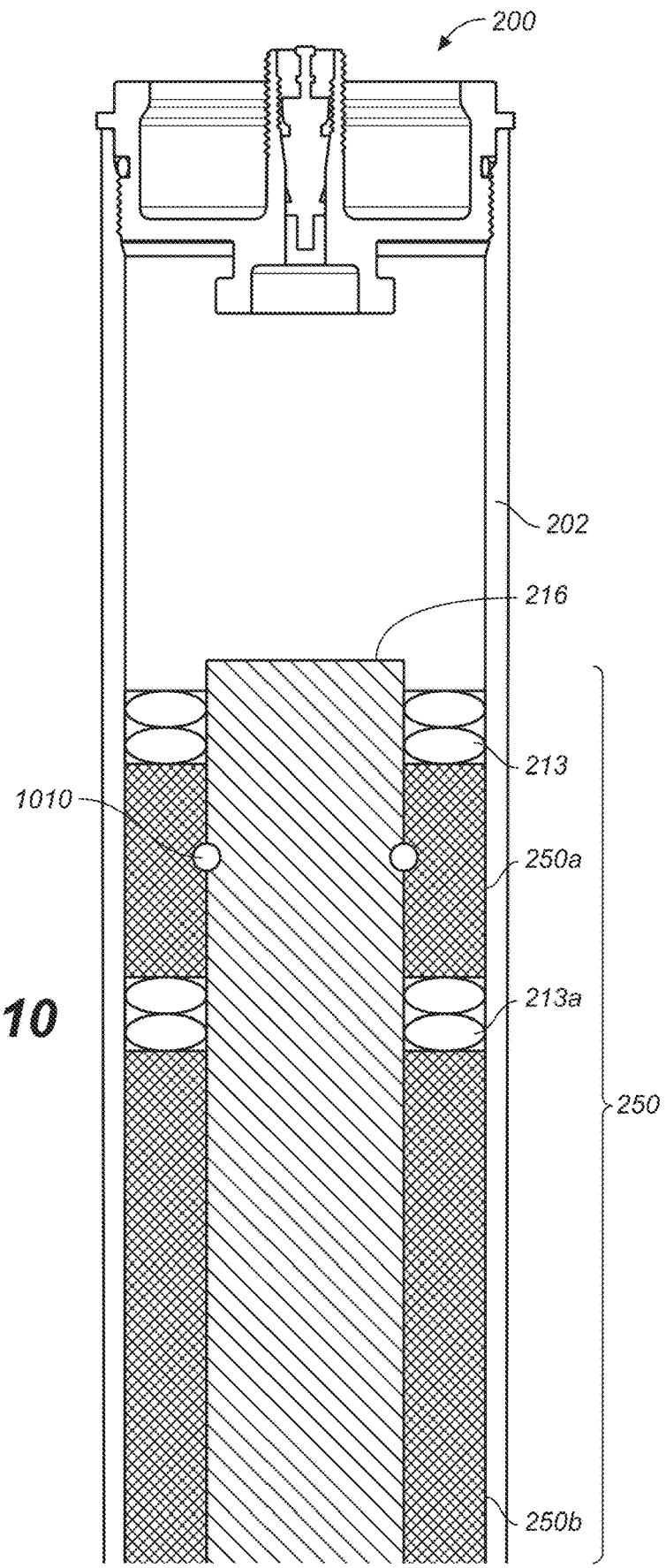
FIG. 10 is a cross-sectional view of the air spring that includes the annular region between the upper tube and the partial cartridge tube to add a gas volume that can be combined with one or more of the other gas volumes in accordance with an embodiment.

With reference now to FIG. 5, a cross-sectional view of a mid-portion of the air spring assembly 200 is shown in accordance with an embodiment. In FIG. 5, annular gas volume 250 is created by dividing positive air spring volume 220 via a static seal (e.g., partial cartridge tube gas seal 213) between the outer wall of the inner partial cartridge tube 216 and the inner wall of upper fork tube 202. Thus, annular gas volume 250 consists of the air space between the interior of upper fork tube 202 and the exterior of partial cartridge tube 216. In one embodiment, annular gas volume 250 is approximately the same length as partial cartridge tube 216. However, it should be appreciated that annular gas volume 250 can be a portion of the length of partial cartridge tube 216 (as shown in FIG. 10), or the like. It should further be appreciated that the cross-sectional views shown herein are taken from an approximately circular front fork 34 structure. Thus, in one embodiment, a width of the annular gas volume 250 would include part or all of the circumferential area that exists from the outside wall of partial cartridge tube 216 to the inner wall of upper fork tube 202. The length of annular gas volume 250 would be the distance from the base gas seal 212a to the partial cartridge tube gas seal 213 running parallel to partial cartridge tube 216.

However, the size of annular gas volume 250 can be modified by changing the outer diameter of partial cartridge tube 216. For example, if the outer diameter of partial cartridge tube 216 is reduced, the annular gas volume 250 would be increased. In contrast, if the outer diameter of partial cartridge tube 216 is increased, the annular gas volume 250 would be reduced. In one embodiment, the adjustment to the size of annular gas volume 250 allows for additional tuning of the air spring assembly 200.

In one embodiment, the adjustment to the annular gas volume 250 is made by changing to a different partial cartridge tube 216 having a different outer diameter. In another embodiment, the adjustment to annular gas volume 250 is made by making a modification to the area of the annular gas volume 250, such as, but not limited to, adding (or taking away) an optional sleeve 577 (or a plurality of sleeves, spacers, inflatable spacers, expandable spacers, etc.) about some or all of the length of partial cartridge tube 216 (or about the inner diameter of upper fork tube 202, or the like); changing the shape of at least a portion of the outside shape of partial cartridge tube 216; changing at least a portion of the shape of upper fork tube 202 to include different inner diameters, different upper fork tube 202 sizes, different upper fork tube 202 inner diameter shapes, etc. and the like. For example, an addition of optional sleeve 577 would reduce the volume of annular gas volume 250 by the amount of volume taken up by the optional sleeve 577. In one embodiment, sleeve 577 (or a plurality of sleeves) could be added to provide fine tuning to the size of annular gas volume 250.

Thus, by using one or more of the adjustments to annular gas volume 250, annular gas volume 250 could range from a very small volume to a volume that is greater than the negative air spring volume 230 discussed herein.

Figure 6:
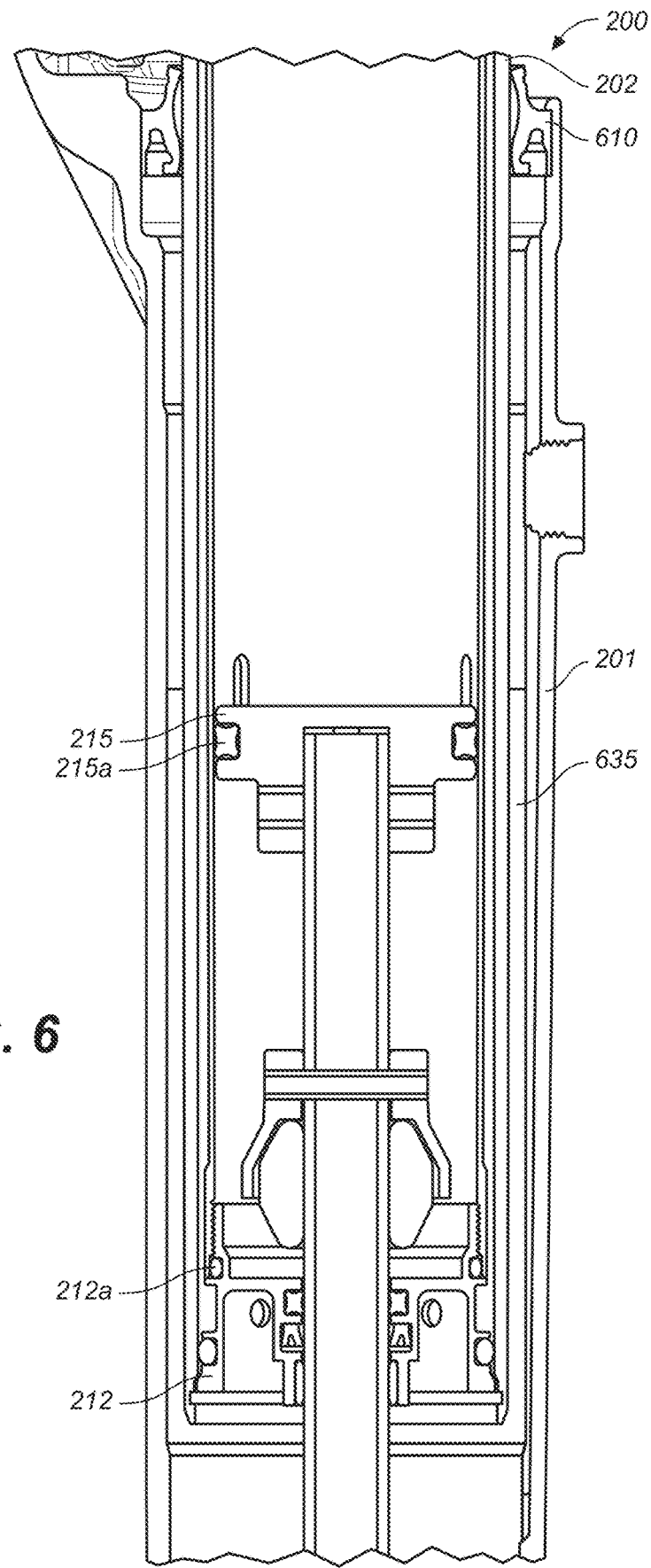
FIG. 6 is a cross-sectional view of a lower mid-portion of the air spring assembly in accordance with an embodiment.

Referring now to FIG. 6, a cross-sectional view of a lower mid-portion of the air spring assembly 200 is shown in accordance with an embodiment. FIG. 6 include air spring gas seal 610 where upper fork tube 202 enters into lower fork tube 201. In general, air spring gas seal 610 seals to atmosphere to form the uppermost boundary of lower leg gas volume 240. The termination of partial cartridge tube 216 with a base lug 635 provides the lowermost boundary of the negative air spring volume 230. In one embodiment, there is a threaded interface between base lug 635 and partial cartridge tube 216.

FIGS. 7-10 are cross-sectional views of air spring assembly 200 that include annular gas volume 250 to add the fourth gas volume that can then be combined in a number of different combinations with the other gas volumes.

Figure 7:
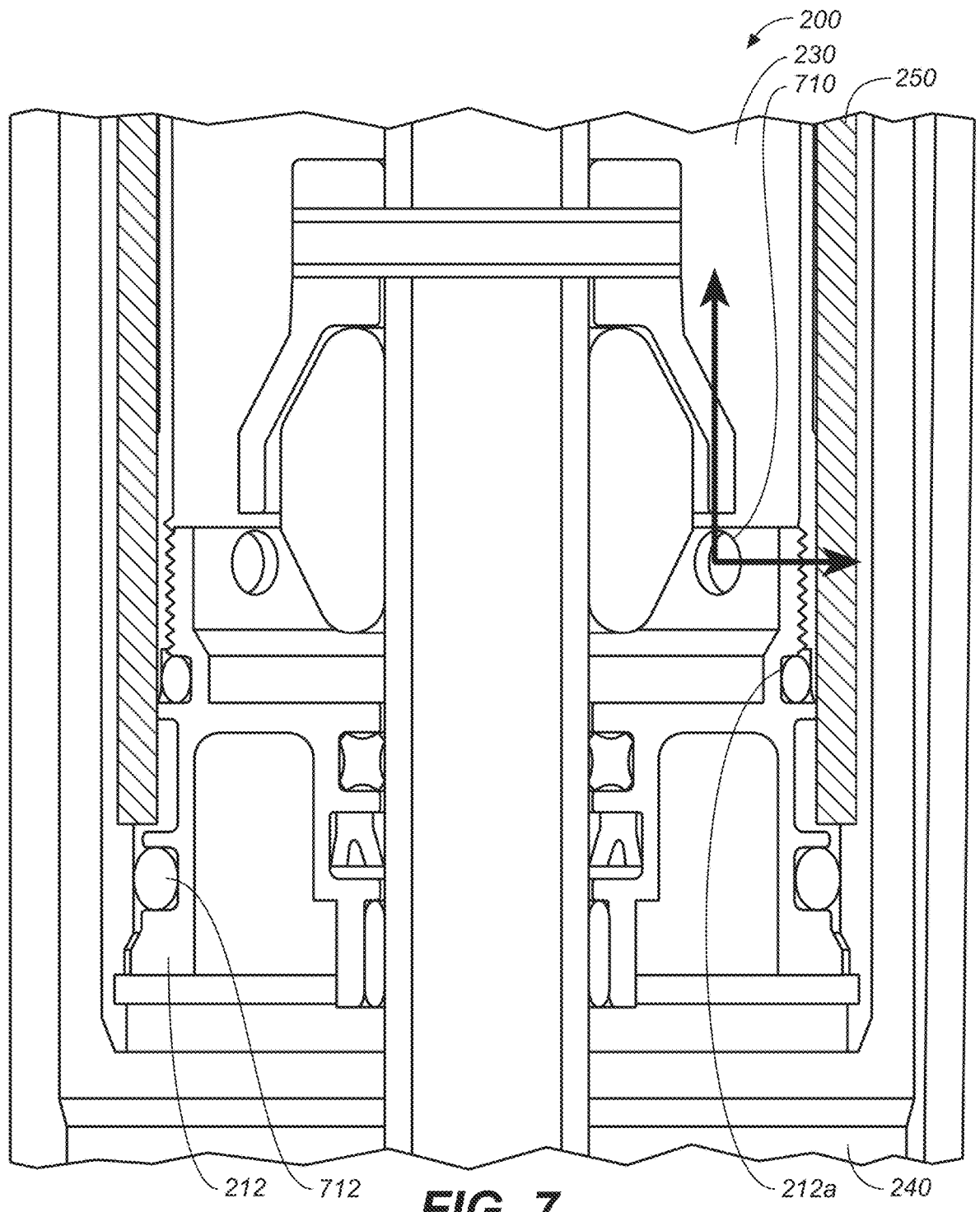
FIG. 7 is a cross-sectional view of the air spring that includes the annular region between the upper tube and the partial cartridge tube to add a gas volume that can be combined with one or more of the other gas volumes in accordance with an embodiment.

For example, as shown in FIG. 7, annular gas volume 250 is fluidly coupled with negative air spring volume 230 via one or more communication channel(s), such as the cross holes 710. In addition, FIG. 7 shows a seal 712 between lower leg gas volume 240 and annular gas volume 250. In one embodiment, seal 712 is an O-ring seal, or the like.

Figure 8:
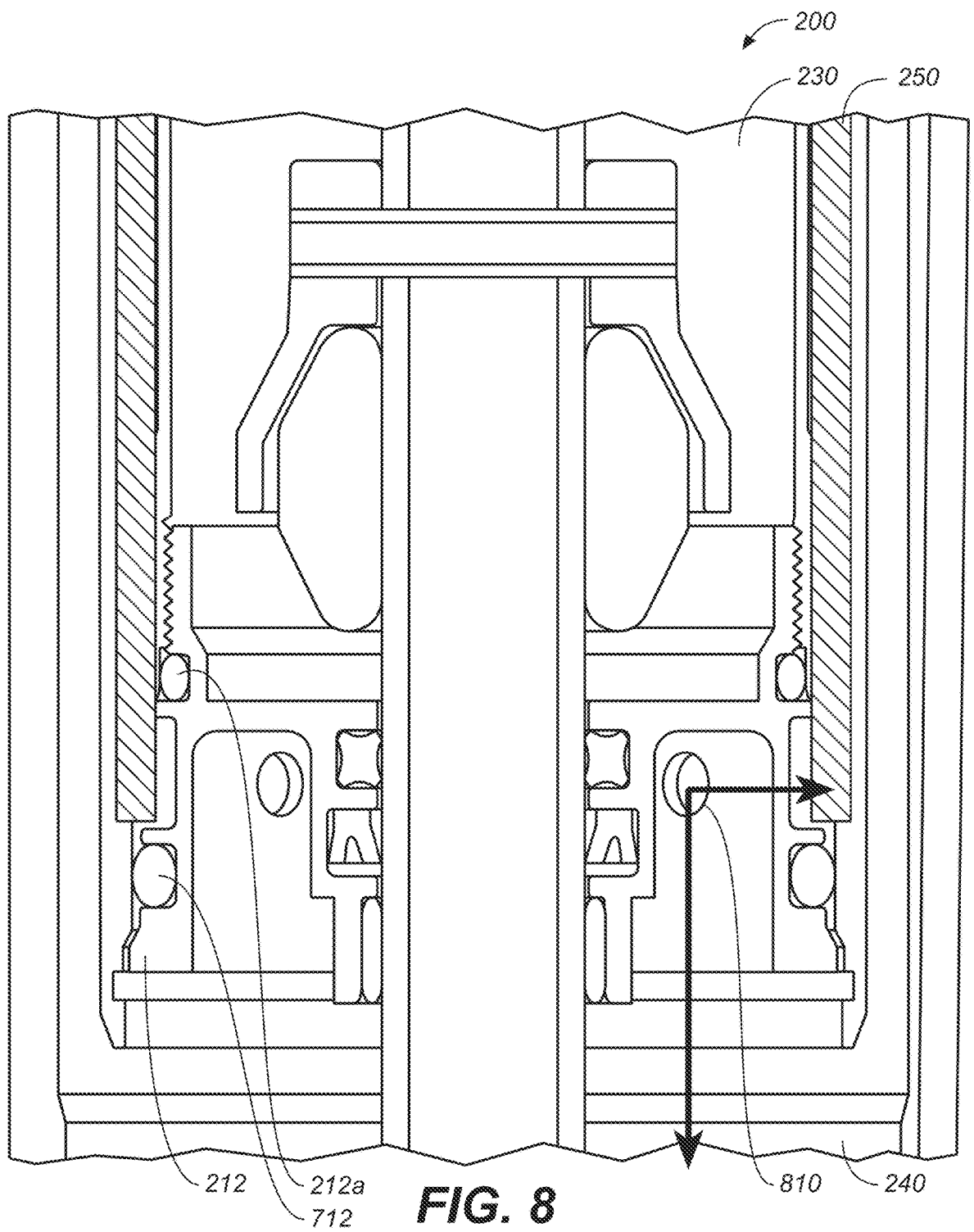
FIG. 8 is a cross-sectional view of the air spring that includes the annular region between the upper tube and the partial cartridge tube to add a gas volume that can be combined with one or more of the other gas volumes in accordance with an embodiment.

In another embodiment, as shown in FIG. 8, annular gas volume 250 is fluidly coupled with lower leg gas volume 240 via one or more communication channel(s), such as the lower volume vents 810. In addition, FIG. 8 shows base gas seal 212a between negative air spring volume 230 and annular gas volume 250. In one embodiment, base gas seal 212a is an O-ring seal, or the like.

Figure 9:
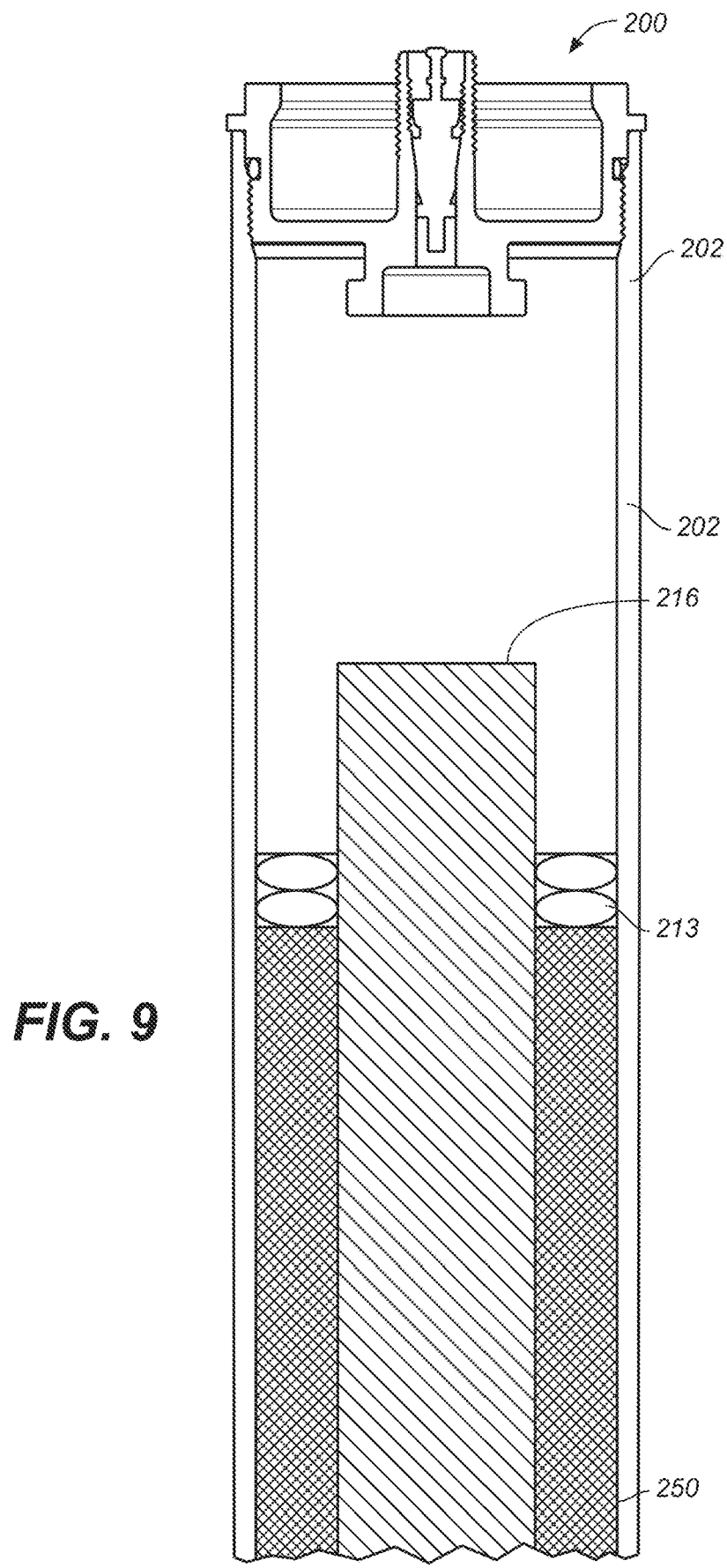
FIG. 9 is a cross-sectional view of the air spring that includes the annular region between the upper tube and the partial cartridge tube to add a gas volume that can be combined with one or more of the other gas volumes in accordance with an embodiment.

Referring now to FIG. 9, in one embodiment, annular gas volume 250 is created by dividing positive air spring volume 220 with a static seal (e.g., partial cartridge tube gas seal 213) between the partial cartridge tube 216 and upper fork tube 202 at a location away from the termination (or top most portion) of partial cartridge tube 216. In other words, partial cartridge tube gas seal 213 is not located at a top most location with respect to partial cartridge tube 216. In one embodiment, by having partial cartridge tube gas seal 213 located other than at the top of partial cartridge tube 216, partial cartridge tube gas seal 213 can be moved to adjust the size of annular gas volume 250 without the length of partial cartridge tube 216 moving, having to be changed, or the like. Moreover, the movement of partial cartridge tube gas seal 213 along the length of partial cartridge tube 216 will allow annular gas volume 250 to be adjusted to a different length that might be less than the minimum size requirements of partial cartridge tube 216.

For example, partial cartridge tube 216 would have to be of some minimum length to allow for a minimum length of stroke of the internal piston assembly. However, by adjusting the location of partial cartridge tube gas seal 213 along the length of partial cartridge tube 216, an additional adjustment capability to the volume of annular gas volume 250 is made available. That is, partial cartridge tube 216 could have a useable length that provides for a first selected piston stroke while the location of partial cartridge tube gas seal 213 along the length of partial cartridge tube 216 would allow for a stand-alone adjustment to annular gas volume 250.

In one embodiment, the location of (or the adjustment to the location of) partial cartridge tube gas seal 213 along the length of partial cartridge tube 216 could be electronically adjustable, manually adjustable (such as via a lever, or the like), to allow for real-time or near real-time adjustments to be made annular gas volume 250. In one embodiment, the location of the partial cartridge tube gas seal defines the upper boundary of the annular volume.

With reference now to FIG. 10 and to FIG. 4, in one embodiment, if there is no fluid pathways between the top of partial cartridge tube 216 and the upper fork tube 202 space 402 such that positive air spring volume 220 does not include space 402, annular gas volume 250 could be broken into at least two different portions. For example, the top of partial cartridge tube 216 would have a partial cartridge tube gas seal 213 that would define the upper boundary of annular gas volume 250 and a second partial cartridge tube gas seal 213a would divide annular gas volume 250 into a top annular gas volume portion 250a (e.g., the portion of annular gas volume 250 above second partial cartridge tube gas seal 213a) and a bottom annular gas volume portion 250b (e.g., the portion of annular gas volume 250 below second partial cartridge tube gas seal 213a).

In one embodiment, top annular gas volume portion 250a is fluidly coupled with positive air spring volume 220 by using one or more vent(s) (or cross holes) therebetween such as vent 1010. While bottom annular gas volume portion 250b is fluidly coupled with negative air spring volume 230 by using one or more vent(s) therebetween such as cross holes 710 shown in FIG. 7.

In another embodiment, top annular gas volume portion 250a is fluidly coupled with positive air spring volume 220 by using one or more vent(s) (or cross holes) therebetween such as vent 1010. While bottom annular gas volume portion 250b is fluidly coupled with lower leg gas volume 240 by using one or more communication channel(s) such as vents 810 similar to the discussion of FIG. 8.

In one embodiment, annular gas volume 250 could be divided into three different portions such that the top annular gas volume portion is fluidically coupled with positive air spring volume 220 by using one or more vent(s) (or cross holes) there between such as vent 1010; While the middle annular gas volume portion is fluidically coupled with negative air spring volume 230 by using one or more vent(s) therebetween such as cross holes 710 shown in FIG. 7; and the bottom annular gas volume portion is fluidically coupled with lower leg gas volume 240 by using one or more communication channel(s) such as vents 810 similar to the discussion of FIG. 8.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. An assembly comprising:
   a first fork tube comprising a first axial end and an opposite axial end;
   a second fork tube comprising an opening to receive said first fork tube;
   a fork tube gas seal proximal to said opening of said second fork tube, said fork tube gas seal providing a gas seal between said first fork tube and said second fork tube;
   a partial cartridge tube within a portion of said first fork tube, said partial cartridge tube comprising:
      a first partial cartridge tube gas seal to form a partial cartridge tube seal between an outer diameter (OD) of said partial cartridge tube and an inner diameter (ID) of said first fork tube;
   a first annular volume formed between said ID of said first fork tube and said OD of said partial cartridge tube, said annular volume disposed between said first partial cartridge tube gas seal and said opposite axial end of said first fork tube;
   a second partial cartridge tube gas seal to form a second partial cartridge tube seal between said OD of said partial cartridge tube and said ID of said first fork tube; and
   a second annular volume formed between said ID of said first fork tube and said OD of said partial cartridge tube, said second annular volume disposed between said first annular volume and said first axial end of said first fork tube.

2. The assembly of claim 1, further comprising:
   a positive air spring volume; and
   a first fluid path fluidically coupling said positive air spring volume with said second annular volume.

3. The assembly of claim 1, further comprising:
   a negative air spring volume; and
   a second fluid path fluidically coupling said negative air spring volume with said first annular volume.

4. The assembly of claim 1, further comprising:
   a positive air spring volume;
   a negative air spring volume;
   a first fluid path fluidically coupling said positive air spring volume and said second annular volume; and
   a second fluid path fluidically coupling said negative air spring volume and said first annular volume.

5. The assembly of claim 1, further comprising:
   a positive air spring volume, said positive air spring volume disposed between said second partial cartridge tube gas seal and first axial end of said first fork; and
   a negative air spring volume, said negative air spring volume disposed between said first partial cartridge tube gas seal and said opposite end of said first fork.

6. The assembly of claim 1, wherein said first partial cartridge tube gas seal is a static seal.

7. The assembly of claim 1, wherein said second partial cartridge tube gas seal is a static seal.

8. The assembly of claim 1, wherein said first partial cartridge tube gas seal is an O-ring.

9. The assembly of claim 1, wherein said second partial cartridge tube gas seal is an O-ring.

10. The assembly of claim 1, wherein said assembly is inverted such that said second fork tube moves telescopically within said first fork tube.

11. The assembly of claim 1, wherein a total volume of said first annular volume is modified by adjusting a location of said first partial cartridge tube gas seal along an axial length of said partial cartridge tube.

12. The assembly of claim 1, wherein a total volume of said second annular volume is modified by adjusting a location of said second partial cartridge tube gas seal along an axial length of said partial cartridge tube.

13. The assembly of claim 1, wherein a total volume of said first annular volume is modified by a replacing said partial cartridge tube with another partial cartridge tube having a different OD than said OD of said partial cartridge tube.

14. The assembly of claim 1, wherein a total volume of said second annular volume is modified by a replacing said partial cartridge tube with another partial cartridge tube having a different OD than said OD of said partial cartridge tube.

15. The assembly of claim 1, wherein a total volume of said first annular volume is modifiable by adding an object into a portion of said first annular volume.

16. The assembly of claim 1, wherein a total volume of said second annular volume is modifiable by adding an object into a portion of said second annular volume.

17. An assembly comprising:
   a first fork tube comprising a first axial end and an opposite axial end;
   a second fork tube comprising an opening to receive said first fork tube;
   a fork tube gas seal proximal to said opening of said second fork tube providing a gas seal between said first fork tube and said second fork tube;
   a partial cartridge tube within a portion of said first fork tube, said partial cartridge tube comprising:
      a partial cartridge tube gas seal to form a partial cartridge tube seal between an outer diameter (OD) of said partial cartridge tube and an inner diameter (ID) of said first fork tube; and
   an annular volume formed between said ID of said first fork tube and said OD of said partial cartridge tube, said annular volume disposed between said partial cartridge tube gas seal and said opposite axial end of said first fork tube.

18. The assembly of claim 17, further comprising:
a positive air spring volume; and
a first fluid path fluidically coupling said positive air spring volume with said annular volume.

19. The assembly of claim 17, further comprising:
a negative air spring volume; and
a fluid path fluidically coupling said negative air spring volume with said annular volume.

20. The assembly of claim 17, wherein a total volume of said annular volume is modified by adjusting a location of said partial cartridge tube gas seal along an axial length of said partial cartridge tube.

* * * * *